Oct. 12, 1948.  H. D. O'NEIL  2,450,909
HYDROSTATIC TESTING DEVICE
Filed June 17, 1946
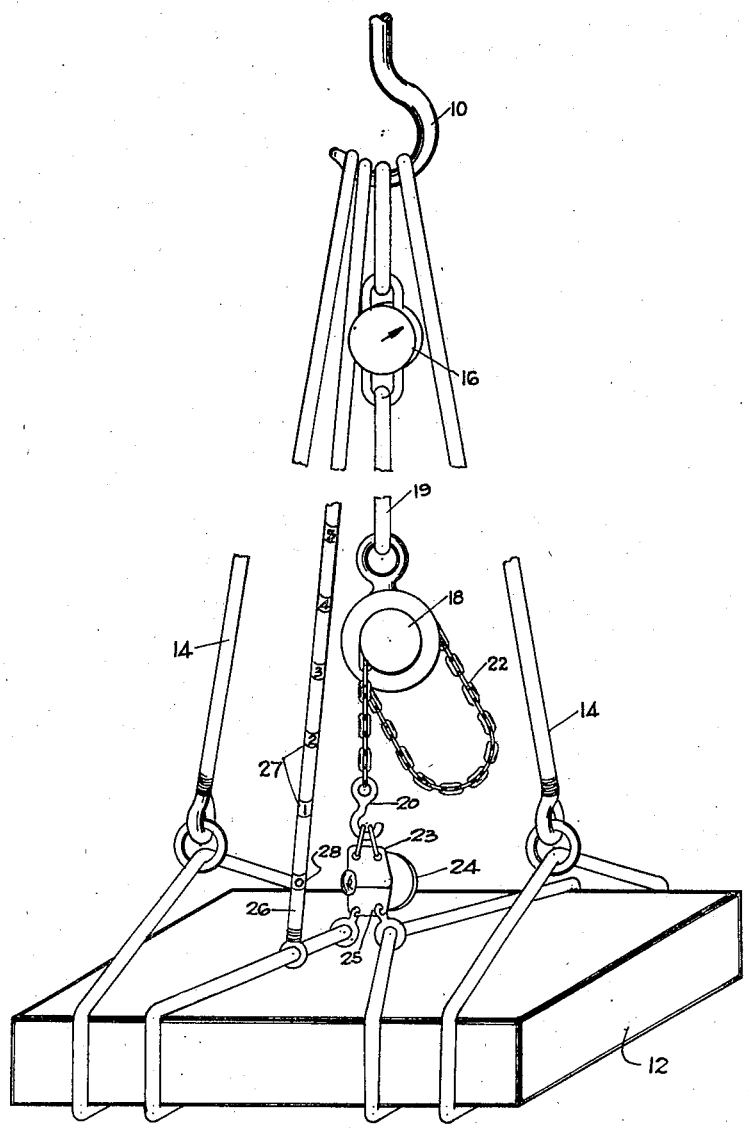
INVENTOR.
HAROLD D. O'NEIL
BY *M. O. Hayes*
ATTORNEY Patented Oct. 12, 1948

2,450,909

UNITED STATES PATENT OFFICE 2,450,909

HYDROSTATIC TESTING DEVICE

Harold D. O'Neil, Hatboro, Pa.

Application June 17, 1946, Serial No. 677,141

3 Claims. (Cl. 73—4)

(Granted under the act of March 3, 1883, as amended April 30, 1928; 370 O. G. 757)

This invention relates to apparatus for testing hydrostatic-release mechanisms.

An hydrostatic-release mechanism, as mentioned herein, is a device used in securing lifeboats and other rescue equipment aboard ships. The lifeboat is secured to one side of the release mechanism the other side of which is secured to some fixed part of the ship. In the event the ship sinks before the lifeboat is released, the two parts of the release mechanism automatically come apart through the action of the water pressure acting thereon, thus allowing the lifeboat to rise to the surface.

An object of this invention is to supply apparatus for conveniently determining the depth at which an hydrostatic-release mechanism operates with a given load.

Further objects and advantages of this invention, as well as its construction, arrangement and operation, will be apparent from the following description and claims in connection with the accompanying drawing, in which, The single figure is an oblique view of the apparatus with the release mechanism mounted ready to test.

The drawing shows a crane hook 10 supporting a weight 12 with suporting lines 14 forming a sling. Hook 10 also supports scale 16 which in turn supports chain fall 18 with line 19. Scale 16 is arranged as to indicate the downward force of the chain fall 18 on the hook 10. The hook 20 can be raised or lowered by pulling chain 22. Hook 20 is attached to one side 23 of the hydrostatic-release mechanism 24. The other side 25 of the mechanism 24 is secured by lines to the weight 12. Scale 16 indicates the tension between the two sides 23 and 25 of the release mechanism 24. This indicated tension is slightly in error due to the weight of the chain fall 18, chain 22 and connecting lines, but this error is small and can be subtracted from the figure indicated on the scale 16 or scale 16 can be calibrated to incorporate a correction for the error. For the purpose of this discussion the error is disregarded.

A line 26 is secured to the weight 12 and is marked off in feet with suitable markers 27. The zero marker 28 is level with the release mechanism 24.

The operation of the apparatus is as follows:

After the apparatus is rigged as shown, the hook 20 is raised by pulling the chain 22 until the desired testing tension is indicated on the scale 16. This tension is no more than the downward force of the weight 12 so that when the desired tension is applied, the weight 12 can be partly supported by the lines 14. The entire apparatus is then lowered into water by means of a crane. When the mechanism 24 is at sufficient depth so that it releases, the scale 16 jumps back to zero and the depth can be seen by observing line 26 at the surface of the water.

To test another release mechanism it is only necessary to lift the entire apparatus out of the water, replace the mechanism 24 by another one to be tested, apply the desired tension by means of the chain fall 18, and again lower the apparatus into the water.

When testing the release device, a maximum and minimum depth are specified between which depths the mechanism 24 should operate. The lines 14 and 19 should be sufficiently long so that the scale 16 is above the surface of the water when the maximum depth is reached.

It is to be understood that various modifications and changes may be made in this invention without departing from the spirit and scope thereof as set forth in the appended claims.

The invention described herein may be manufactured and used by or for the Government of the United States of America for governmental purposes without the payment of any royalties thereon or therefor.

What is claimed is:

1. Apparatus for testing an object under adjustable tension, said apparatus comprising a support; a sling depending from said support; a weight supported by said sling below said support; a tension line extending from said support to said weight, said tension line including means for adjusting tension in said line, means for indicating tension in said line, and means for mounting the object in the line subject to the adjusted tension; and a linear scale extending vertically from the mounting means to indicate distance upward from the object.

2. Apparatus for testing a hydrostatic-release mechanism under adjustable tension by immersion in water to a depth of sufficient hydrostatic pressure to operate the mechanism, said apparatus comprising a hook; a sling depending from said hook; a weight supported by said sling below said hook; a tension line extending from said hook to said weight, said tension line including a chain fall for adjusting tension in said line, a tension scale for indicating tension in said line, and means for mounting the hydrostatic-release mechanism in the line subject to the adjusted tension; and a linear scale extending vertically from the mounting means to indicate the depth of immersion of the hydrostatic-release mechanism when immersed in water.

3. Apparatus for testing an object under adjustable tension, said apparatus comprising a support; a sling depending from said support; a weight supported by said sling below said support; and a tension line extending from said support to said weight, said tension line including means for adjusting tension in said line, means for indicating tension in said line, and means for mounting the object in the line subject to the adjusted tension.

HAROLD D. O'NEIL.

REFERENCES CITED

The following references are of record in the file of this patent:

UNITED STATES PATENTS

| Number | Name | Date |
|---|---|---|
| 1,505,997 | Elia | Aug. 26, 1924 |
| 1,695,701 | Steiner et al. | Dec. 18, 1928 |
| 2,178,901 | Webster | Nov. 7, 1939 |
| 2,304,363 | Johansen | Dec. 8, 1942 |